April 17, 1962 J. T. COLLINS 3,030,566
TRANSISTOR FREQUENCY MULTIPLIER
Filed Dec. 1, 1959
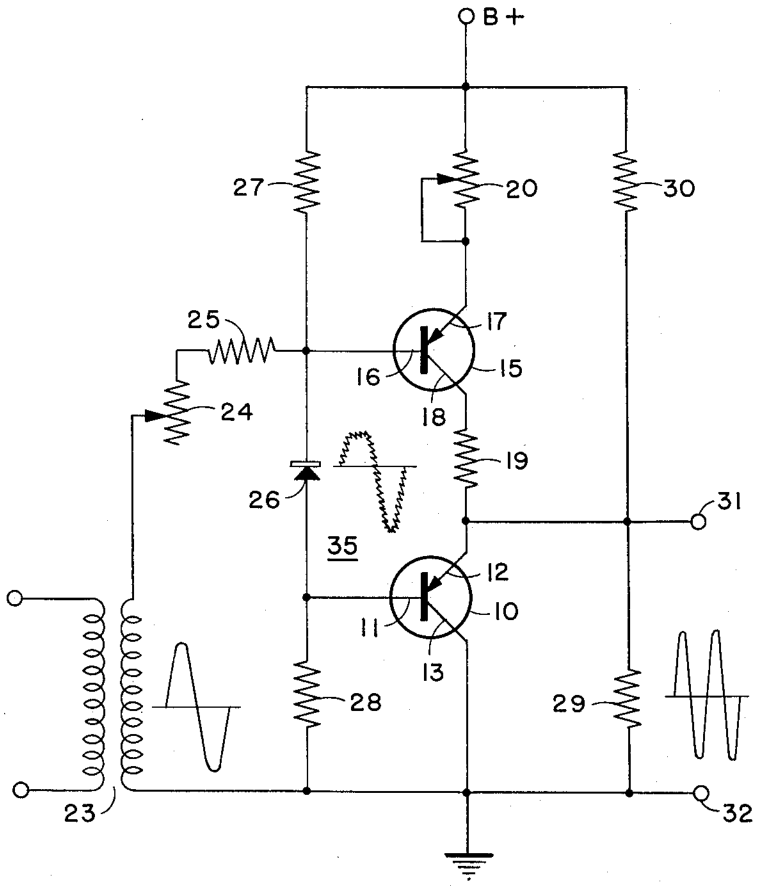
INVENTOR.
JAMES T. COLLINS.
BY Alden D. Redfield
Irwin P. Garfinkle
ATTORNEYS.

3,030,566
Patented Apr. 17, 1962

3,030,566

TRANSISTOR FREQUENCY MULTIPLIER

James T. Collins, Cincinnati, Ohio, assignor to Avco Corporation, Cincinnati, Ohio, a corporation of Delaware Filed Dec. 1, 1959, Ser. No. 856,552
5 Claims. (Cl. 321—69)

This invention relates to a transistorized constant phase frequency multiplier utilizing only resistive elements for phase and frequency adjustment.

Frequency multiplication is commonly accomplished by generation of harmonics in a non-linear device, selection of the desired harmonic by means of high Q selective circuits, and amplification of the selected frequency. This invention represents a departure from the prior art in that means are provided for multiplying the frequency without the use of conventional frequency-selective circuits.

An object of this invention is to provide a constant phase frequency multiplier wherein conventional tuned circuitry is not required.

Another object of this invention is to provide miniaturized and simplified circuitry, and to increase the reliability of frequency multipliers.

For other objects and a better understanding of the nature of this invention, reference should now be made to the following detailed description of the invention and to the accompanying drawing in which the single FIGURE illustrates a frequency multiplier incorporating the principles of this invention.

The frequency multiplier shown includes a first transistor 10 having a base 11, an emitter 12 and a collector 13, and a second transistor 15 having a base 16, an emitter 17 and a collector 18. The collector and emitter electrodes of the transistors are connected in a direct current series loop, including a feedback load resistor 19, an adjustable biasing resistor 20, and a battery or any other suitable direct current source of B+ supply. While PNP type transistors are illustrated, it is obvious that the NPN type transistors may also be used by appropriate changes in various circuit connections.

Alternating current signals, which may be generated from any convenient source designated at 23, are supplied to the transistors through potentiometer 24 and fixed resistor 25. The base 16 of transistor 15 is directly connected to the fixed resistor 25, while the base 11 of transistor 10 is connected to the resistor 25 through a diode 26. As reduced to practice, a zener diode was used, but it will be understood that any diode with a good forward/back ratio will work equally well. A direct current base-biasing resistor 28 is connected from between the collector 13 and the base 11 of transistor 10, while a second base-biasing resistor 27 is connected between the B+ supply and the base 16 of transistor 15. An output resistor 29 is provided for the transistor 10 while, as will be seen, resistor 30 provides feedback from the output of the transistor 10 to the base of transistor 15. With proper circuit adjustment in a manner hereinafter described, an output having a frequency which is an even multiple of that of the generated signal is derived from across the resistor 29 at the terminals 31 and 32.

For the purpose of better understanding the operation of the described circuitry, the alternating current input signal generated at 23 and supplied to the transistors 10 and 15 should be considered the system clock, and although a sine wave of a given frequency was used in the particular embodiment illustrated, it is to be understood that other wave forms may serve equally well as the clock signal to produce a multiplied frequency sinusoidal output.

The potentiometer 24 is adjusted to provide a slight back bias on the diode 26, and the resistor 20 is adjusted for the correct gain to produce the desired wave shape. The resistor 20 represents a negative feedback element contributing to gain, stability, and fidelity of the system.

Without the signal voltage applied from the source 23, the circuit is adjusted so that the transistor 15 is biased into a state of relatively low conduction while the transistor 10 is biased into a state of relatively high conduction. When a signal voltage is introduced, the negative-going portions of the signal (in the case of PNP type transistors illustrated), when applied through the diode 26 to the base 11 of the transistor 10, cause the emitter current of transistor 10 to increase proportionately. At the same time there may be a relatively small increase in current through the transistor 15; but since that transistor is biased for low conduction, such increase will have little effect on circuit operation. The increased current through transistor 10 is drawn through the resistor 30, thereby producing a large voltage drop across resistor 30 to increase the collector-emitter bias on transistor 15 while simultaneously decreasing the collector-emitter bias on transistor 10. This also produces a large voltage change across the output resistor 29, and this change is fed back through the resistor 30, the resistor 27, and the diode 26 which acts as a diode gate redriving the input circuit of transistor 10. That is, the output voltage of transistor 10 is fed back across the resistor 28, 180 degrees out of phase with the drive or clock signal from source 23. These actions cause transistor 15 to conduct heavily at a time lagging the initiating drive on transistor 10, thereby producing heavy conduction through the resistor 19 which is in a series or modulating loop 35, including the base-emitter junction of transistor 10, the base-collector junction of transistor 15, and the diode 26.

It will be seen that the resistor 19 constitutes a source of positive feedback in the series loop 35 which will tend to oscillate at its natural period. In effect, the loop 35 functions as a resonant type of oscillatory filter selecting the desired harmonic or components from the resistor 19, the driver source for the filter loop. In a circuit actually reduced to practice, the series loop oscillations occurred at a frequency approximately ten times that of the output frequency and at an amplitude which was relatively low, due to the low Q of the circuit.

At this point it will be seen that the diode 26 passes the signal from the source 23 once every negative half-cycle. That is to say, on the negative half-cycle the signal voltage serves to produce heavy conduction of transistor 10 followed by heavy conduction of transistor 15. The heavy conduction through transistor 15 produces heavy conduction through the feedback resistor 19, thereby causing damped oscillations in the series or modulating loop 35.

The signal voltage on resistor 19 contains the fundamental and a series of harmonics. The modulator or series loop 35 is adjusted to function as a filter sensitive to the desired harmonic, for example, the second harmonic in the case of frequency doubling. The positive feedback originating with the feedback resistor 19 modulates the series loop into low order oscillations, and these oscillations are integrated through diode 26 and eventually reach coincidence with the signal of source 23 (the clock signal). When this occurs the diode gate is open for the passage of the positive half-cycle components. The system design must provide for this coincident condition at the proper electrical time to provide a full wave drive to the input of transistor 10 and an amplified, multiplied frequency of like order across the load resistor 29.

Actual measurement shows that the amplitude of the loop oscillations is sufficient to modulate the drive signal as shown. The diode 26 in the series loop functions additionally as a variable capacitor and, therefore, it operates to maintain the correct loop oscillation magnitude and frequency, and the series loop performs the functions of a second order servo accurately phasing and locking in the drive and feedback voltages.

By choosing the proper circuit parameters to effect the right order filter in the modulator or series loop 35, essentially any even order harmonic may be derived from the terminals 31 and 32. By adjusting resistor 20 in the emitter circuit of transistor 15, the time of increased conduction of transistor 15 may be varied, thereby controlling the phase of the oscillations in the modulator or series loop 35, and it also controls the phase of the feedback voltage which, in the case of a frequency doubler, lags the source signal voltage by 180 degrees. With the resistor 29 properly load-matched, the progressive drive on the load combination from the low impedance transistor source, in conjunction with the feedback loop, causes it to function essentially as a high Q tank circuit to produce sinusoidal wave restoration, thereby producing a sine wave output having a frequency which is a multiple of the input frequency.

It has been found that the particular circuit requirements are relatively critical for parameter selection throughout, and the values of the various resistors must be selected with some care so as to produce the desired gain and wave form. While this invention is not limited to any particular set of circuit parameters, the following were incorporated in frequency-doubling equipment actually reduced to practice and successfully tested extensively:

| Resistors: | Ohms |
|---|---|
| 19 | 1 K. |
| 20 | Variable to 5 K. |
| 24 | Variable to 100 K. |
| 25 | 82 K. |
| 27 | 82 K. |
| 28 | 82 K. |
| 29 | 39 K. |
| 30 | 4.7 K. |

Once the resistor 20 and the potentiometer 24 are initially adjusted to obtain the proper phasing for a particular multiplication, operation has then been found to be relatively stable. In some cases it may also be desirable to make resistor 28 adjustable to simplify the initial setting of the circuit for a given operation.

It will be recognized that the frequency-multiplying capabilities of this invention are adaptable to any band of frequency, the limiting factor being the cutoff frequency of the transistors. With the above parameters used in connection with an analog-to-digital converter, frequency-doubling was effected from 0 to 30 kilocycles.

Higher orders of frequency multiplication will be accomplished by adjustment of the control parameters, but the use of weaker harmonics may necessitate increased amplification in the series loop. Such amplification may be accomplished by making the resistor 19 an active amplifier. In addition, multiplication of odd harmonics may be obtained, but this will necessitate circuitry which will produce the correct phase shift for the reflex voltages. For example, the third harmonic will require a 120 degree phase shift instead of the 180 degree phase shift. It will be apparent that amplifiers, additional stages, and other supporting circuitry may be incorporated to suit the particular application requirements, and such modifications should impose no limitations on the scope of this invention, since it is readily adaptable to essentially any order of frequency multiplication or division.

It should be noted that this invention is unique in that various output frequencies may be derived by the manual adjustment of resistance parameters only, and in that a sinusoidal output is obtained using parameters which are dominantly resistive. Although the source 23 is shown as inductive, it is not necessary, and a resistive input may be used to advantage.

By means of this invention, therefore, a system of frequency multiplication has been produced wherein the output voltage is controlled in amplitude, phase, and frequency, these results being accomplished by the establishment of a second order servo system within the modulating or series loop 35 to effectively obtain double integration with respect to time.

Since various modifications of the illustrated embodiment are readily apparent, it is intended that this invention be limited only by the scope of the appended claims as interpreted in the light of the prior art.

What is claimed is:

1. A transistorized frequency-multiplying circuit comprising: a signal source; first and second transistors, each having base, emitter and collector electrodes, said first transistor having a first input circuit between its base and collector electrodes and a first output circuit between its collector and emitter electrodes, said second transistor circuit having a second input circuit between its base and collector electrodes and a second output circuit between its base and emitter electrodes; a non-linear impedance device connected between said signal source and said first input circuit; a source of direct current potential; a positive feedback resistor connected between the collector electrode of said second transistor and the emitter electrode of said first transistor, the emitter and collector electrodes of said transistors and said positive feedback resistor being connected in a series circuit with said source, said positive feedback resistor also being connected in a direct current series loop including the base-emitter junction of said first transistor, the base-collector junction of said second transistor, and said non-linear impedance device, said first transistor being biased for relatively high conduction in the absence of signal from said signal source, and said second transistor being biased for relatively low conduction in the absence of signal from said signal source; feedback means connected from said first output circuit to said second input circuit; whereby increased conduction of said first transistor increases the collector and emitter potential of said second transistor to cause increased conduction of said second transistor and to establish oscillations in said series loop.

2. The invention as defined in claim 1 wherein said non-linear impedance device is a diode.

3. The invention as defined in claim 1, and control means in said series circuit including the collector and emitter electrodes of said transistors, said positive feedback resistor and said source of direct current potential for controlling the time of said increased conduction to regulate the phase of said oscillations in said series loop.

4. A transistorized frequency-multiplying circuit comprising: an alternating current signal source; a first transistor having base, emitter, and collector electrodes; a non-linear impedance device; means coupling said source to said base and collector electrodes of said first transistor through said non-linear impedance device; and means for deriving an output signal at a frequency which is a multiple of the frequency of said alternating current signal source from between said emitter and collector electrodes, said means including a second transistor having base, emitter, and collector electrodes; a resistor, said base and collector electrodes of said second transistor being connected in a series loop with said resistor, the emitter and base electrodes of said first transistor and said non-linear impedance device; a feedback connection from the emitter electrode of said first transistor to the base electrode of said second transistor, said first transistor being biased for relatively high conduction in the absence of input signal, and said second transistor being biased for relatively low conduction.

5. The invention as defined in claim 4 wherein said non-linear impedance device is a diode.

References Cited in the file of this patent

UNITED STATES PATENTS 2,891,726 Decker et al. ----------- June 23, 1959